No. 855,678. PATENTED JUNE 4, 1907.
F. THÜRRID.
PLOW AND SEEDER.
APPLICATION FILED FEB. 27, 1907.
4 SHEETS—SHEET 1.
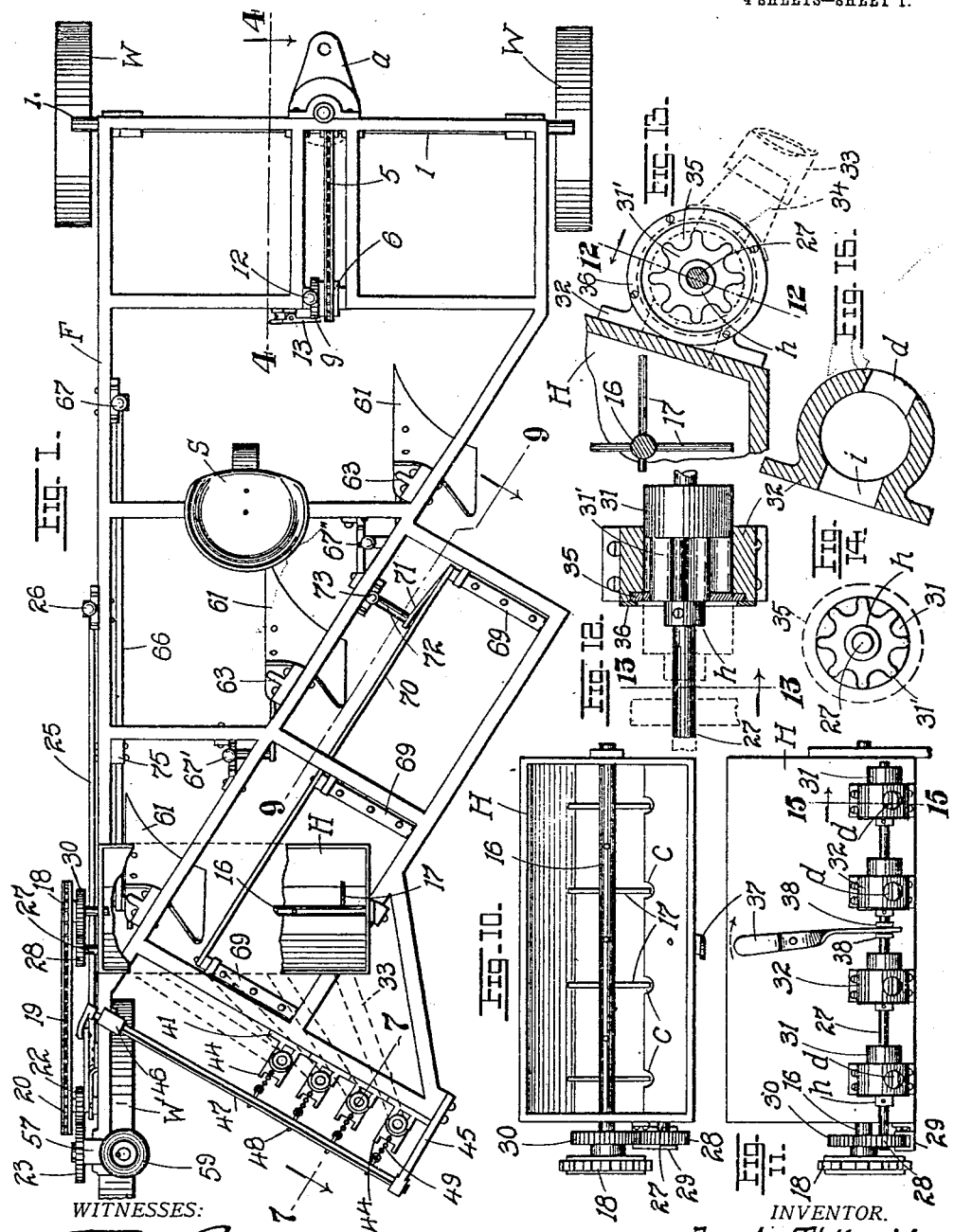
WITNESSES:
Phil J. Nawn
M. D. Whitcomb
INVENTOR.
Frank Thürrid
BY Emil Starek
ATTORNEY.

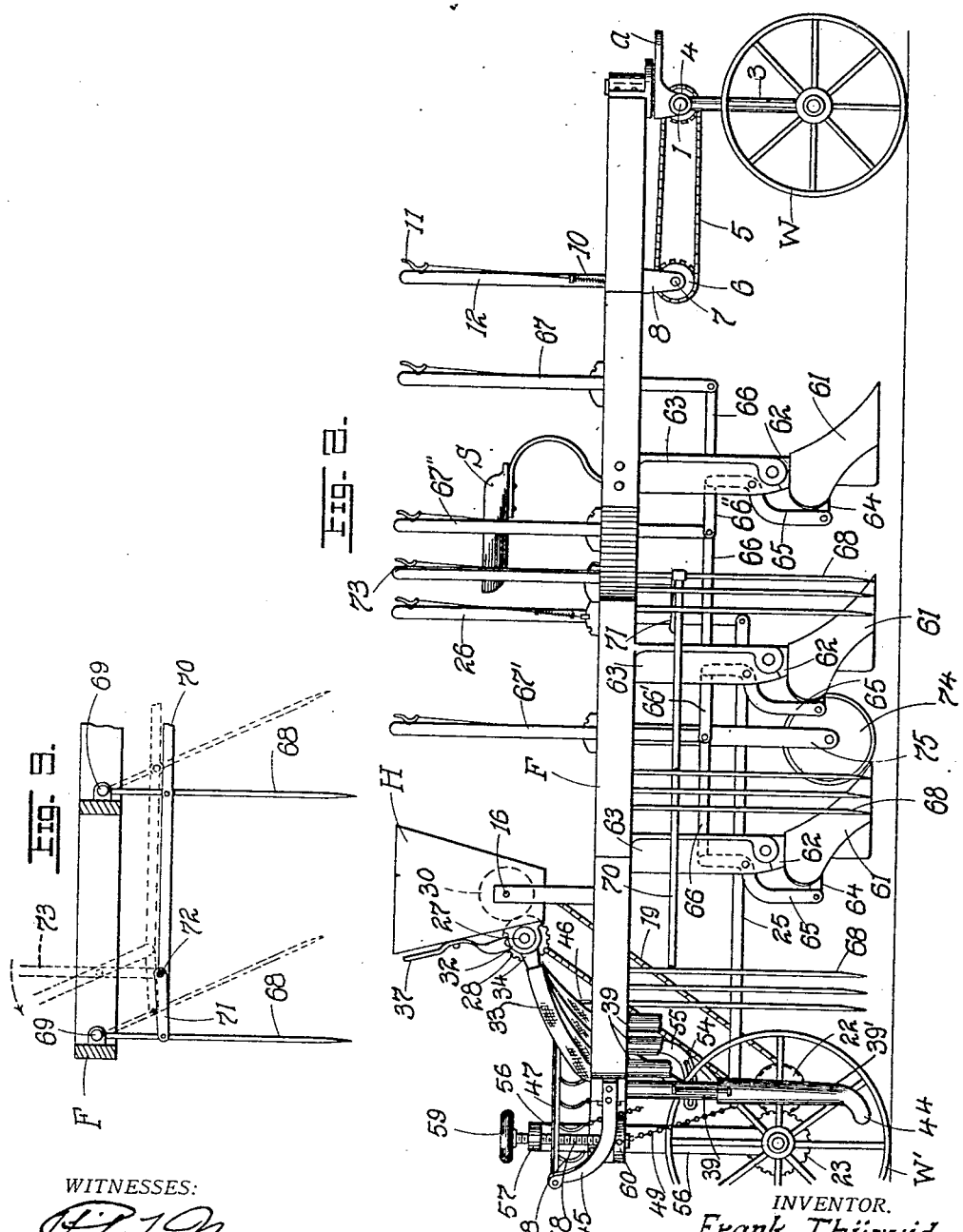

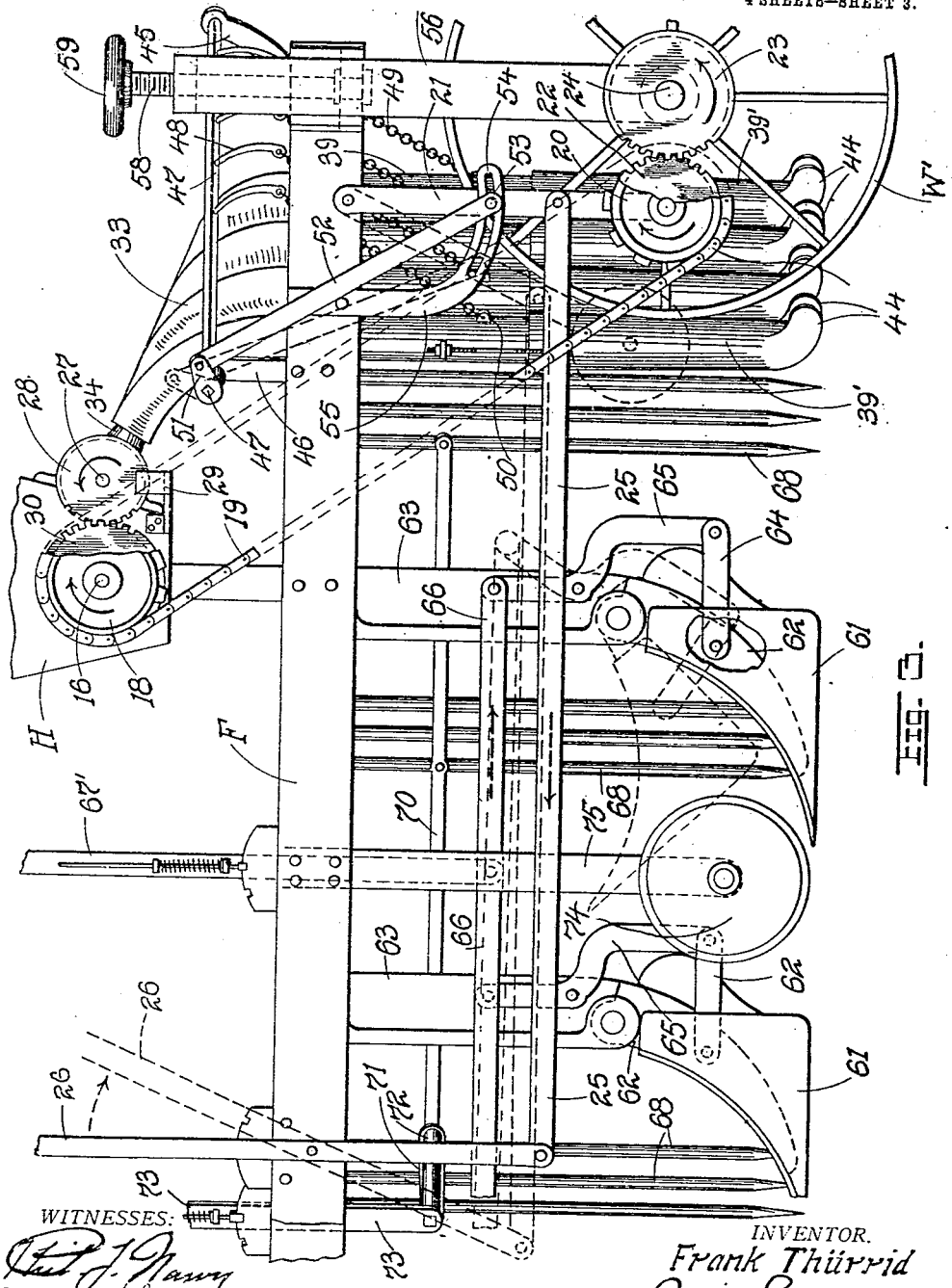

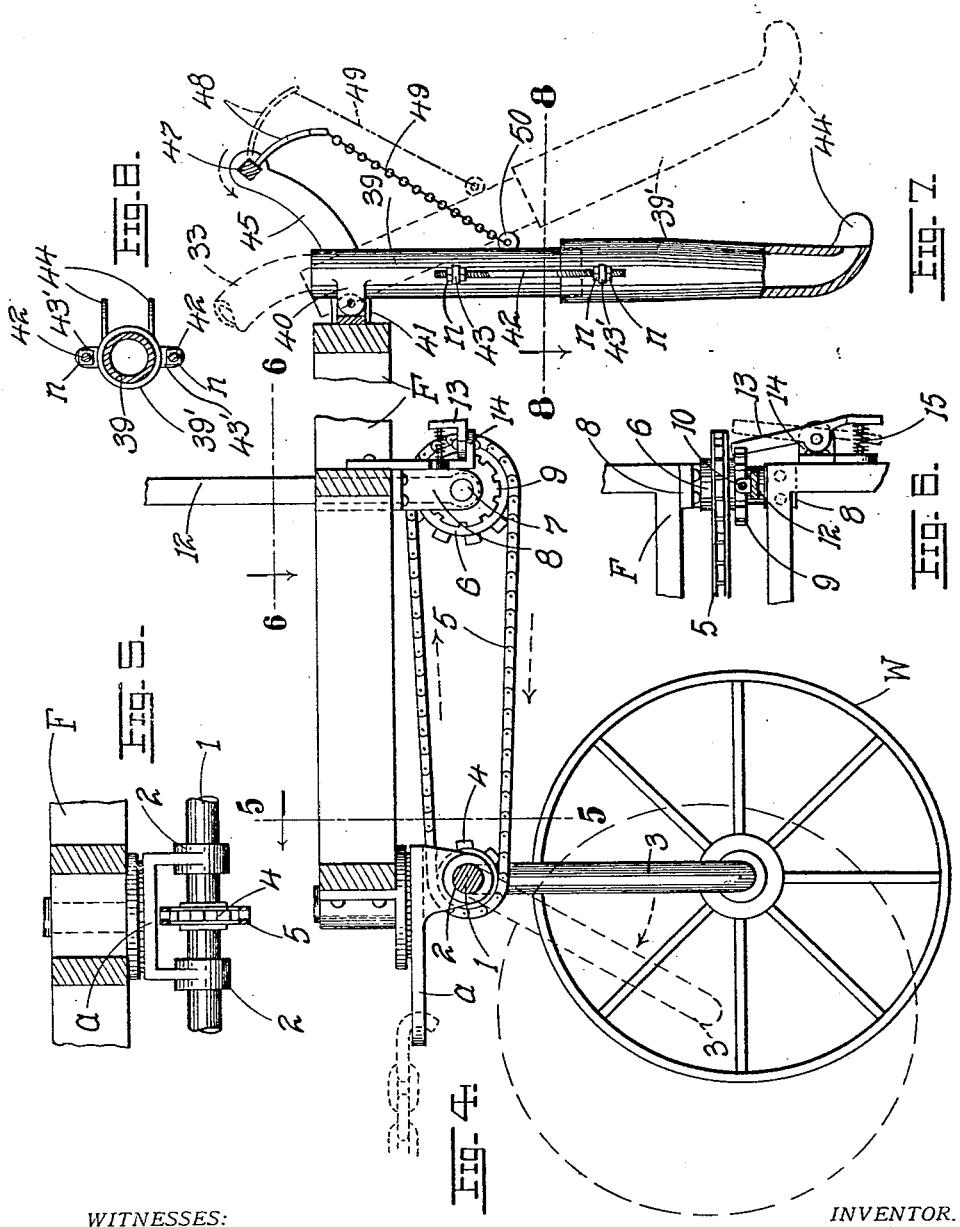

UNITED STATES PATENT OFFICE.

FRANK THÜRRID, OF ST. LOUIS, MISSOURI.

PLOW AND SEEDER.

No. 855,678.　　　Specification of Letters Patent.　　　Patented June 4, 1907.

Application filed February 27, 1907. Serial No. 359,593.

*To all whom it may concern:*

Be it known that I, FRANK THÜRRID, a citizen of the United States, residing at St. Louis, State of Missouri, have invented certain new and useful Improvements in Plows and Seeders, of which the following is a full, clear, and exact description, reference being had to the accompanying drawings, forming a part hereof.

My invention has relation to improvements in plows and seeders; and it consists in the novel construction and arrangement of parts more fully set forth in the specification and pointed out in the claims.

In the drawings, Figure 1 is a top plan of the machine; Fig. 2 is a side elevation of the same; Fig. 3 is an enlarged side elevation of the rear portion of the machine viewed from the side opposite to that shown in Fig. 2; Fig. 4 is an enlarged vertical section of the front portion taken on the line 4—4 of Fig. 1; Fig. 5 is a vertical cross-section on the line 5—5 of Fig. 4; Fig. 6 is a horizontal section on line 6—6 of Fig. 4; Fig. 7 is a detached elevational view of one of the seed-spouts and means for elevating the same the parts in section being on line 7—7 of Fig. 1; Fig. 8 is a cross-section on line 8—8 of Fig. 7; Fig. 9 is a vertical diagonal section on the line 9—9 of Fig. 1 showing manner of controlling the harrow arms or rakes; Fig. 10 is a detailed top plan of the seed trough; Fig. 11 is a rear elevation thereof showing valve shaft for choking or cutting off the seed; Fig. 12 is a longitudinal section on line 12—12 of Fig. 13 showing the combination feed and cut-off valve for the seed; Fig. 13 is a transverse section on the line 13—13 of Fig. 12; Fig. 14 is an end view of the feed-and-cut-off valve for the seed; Fig. 15 is a transverse vertical section of the valve-casing on the line 15—15 of Fig. 11.

The object of my invention is to construct a plow and seeder in which a single machine may embody a maximum number of advantages derived from the perfect and ready control of the part by the operator over such portions as the plows, the feed mechanism for the seed, the harrows or rakes, the distributing pipes or seed-spouts, the depth to which the furrows shall be plowed and the seed planted, and the readiness with which the several parts may be manipulated, all as will be more fully apparent from a detailed description of the invention which is as follows:

Referring to the drawings, F, represents the machine frame, W, W the bearing wheels of the front truck, and W' the rear bearing wheel. The front truck is composed of a rock-shaft 1 mounted loosely in bearings 2, 2 depending from the lower fifth-wheel plate or section a of the truck, the ends of the shaft having depending therefrom the arms 3, 3, having outwardly deflected studs or spindles on which the wheels W, W are mounted. The shaft 1 with its arms 3, 3, forms in effect a U-shaped yoke to which the wheels W, W are secured, the yoke freely oscillating about the axis of the rock-shaft 1, and for a purpose which will now appear: Carried by the shaft 1 between the bearings 2, 2 is a sprocket-wheel 4 over which passes a sprocket chain 5, the chain passing rearwardly over a larger sprocket-wheel 6 whose shaft or spindle 7 is mounted in the depending brackets 8.

The hub of the sprocket-wheel 6 is provided with a ratchet wheel 9 normally engaged by a spring-actuated pawl 10 controlled by a bell-crank lever 11 at the upper end of a lever 12 whose lower end freely oscillates about the spindle 7. By oscillating the lever 12 in proper direction, the pawl 10 carried thereby will rotate or advance the ratchet 9, and hence impart rotation to the sprocket wheel 6. This in turn will rotate the sprocket 4 and hence rock the shaft 1 of the yoke aforesaid about its axis. Should the direction of rotation imparted to the chain 5 be as indicated by the arrows in Fig. 4, the yoke will rock to throw the arms 3, 3 outwardly and forwardly, virtually raising the wheels W, W, or what amounts to the same thing (since the wheels can not actually raise off the ground) depressing the front end of the machine frame F should this be desirable for any purpose. Ordinarily the sprocket wheel 6 is locked against rotation by one arm of a horizontally oscillating trigger 13 pivoted between lugs 14, the trigger arm being forced into permanent engagement with the teeth of the ratchet 9 by a spring 15 interposed between the opposite arm of the trigger and the frame F, (Fig. 6). When the operator desires to rock the shaft 1, he first forces the trigger arm 13 out of engagement with the ratchet 9, by pressing his foot against the trigger arm so as to compress the spring 15, thereby oscillating the opposite arm out of engagement, whereupon the sprocket wheel 6 will be free for any rotation that may be imparted thereto for the purpose already stated. The seat S is conveniently located to enable the operator to reach all the actuating levers of the machine.

The seed-hopper H is near the rear end of the machine, being disposed at right angles thereto as shown. Mounted longitudinally of the hopper is a shaft 16 provided with series of radially disposed stirrer arms 17 which serve to agitate the seed contents of the hopper, the outer end of the shaft 16 terminating in a sprocket wheel 18 from which passes downwardly a sprocket-chain 19 over a sprocket-wheel 20 carried at the lower end of an arm 21 depending from the frame F and capable of oscillation in a vertical plane. The hub of the wheel 20 likewise carries a gear wheel 22 which meshes with a similar gear wheel 23 on the axle-stud 24 of the rear wheel W' (Fig. 3). From these connections as described, it is apparent that as the machine is drawn along the ground, rotation of the wheel W' will impart rotation to the hopper shaft 16 and hence to the stirrer arms 17. The gear wheel 22 can however be disengaged from the gear 23, in which event the shaft 16 will come to a stand-still. This may be accomplished by the following disengaging mechanism: As stated, the gear wheel 22 and sprocket 20 are mounted at the lower end of the arm 21 which is pivoted to the frame F and capable of oscillation in a vertical plane. Pivotally coupled to the arm 21 (Fig. 3) at an intermediate point of its length is one end of a horizontal link 25 extending forwardly along the outside of the machine-frame, its forward end being pivotally coupled to the lower arm of a vertically oscillating lever 26 pivoted to the frame F. By oscillating the lever 26 to the dotted position shown in Fig. 3, the connections described will assume the corresponding dotted positions shown in said Fig. 3, that is to say, the gear 22 will be swung out of engagement with the gear 23 and the shaft 16 will come to a stop.

Mounted on the outside at the base of the rear of the seed-hopper H is a combined rotating and longitudinally adjustable or reciprocating valve-shaft 27 whose one end is slidingly feathered to a gear wheel 28 held against displacement by a channel-bracket 29 (Fig. 11), said gear wheel 28 meshing with a gear-wheel 30 on the shaft 16. Disposed along the shaft 27 and secured thereto in any mechanical manner are a series of seed-valves, each valve comprising a cut-off disk or cylindrical section 31, and a longitudinally peripherally grooved and ribbed feed-section 31', the end view of the grooved and ribbed section having the appearance of a star-wheel (Fig. 14). These valves 31, 31', are capable of adjustment or reciprocation in suitable valve-casings 32 bolted to the hopper wall (Fig. 11), each valve-casing having an inlet opening $i$, communicating with the interior of the hopper through the passages $c$ (Fig. 10) and an outlet or discharge opening $d$ leading to the hose conveyer 33 through a spout 34. The star-shaped portion 31' of the seed-valve loosely passes through a packing ring or rosette 35 interiorly ribbed-and-grooved, said packing ring being received in a suitable depression or pocket in the end of the valve-casing 32 (Fig. 12) and held in place by a securing ring 36. Preferably the valves are secured to the shaft 27 by screws passed through the hubs $h$ formed with the star-shaped section 31'. During the rotation of the valve-shaft 27, the latter may be moved longitudinally in its bearings, by means of the oscillating shifting lever 37 pivoted to the hopper wall, the end of one arm of the lever engaging the collars 38, 38 on the shaft, a well-known form of construction of shifting mechanism. By throwing the lever 37 in the direction shown by the arrow in Fig. 11, the disk or cylinder portions 31 of the seed valves will be forced into their respective casings 32, filling the entire space of the casings, and thus effectively choking or cutting off communication between the openings $i$ and $d$ (see dotted position Fig. 12). So that discharge of the seed is impossible under the circumstances; but when the lever 37 is thrown so as to bring the star-shaped sections 31' of the valves between the openings $i$, $d$ (Figs. 11, 12), the ribbed-and-grooved formations of such sections 31' carry the seed over from the openings $i$ to the discharge openings $d$, when it is free to drop into the conducting hose conveyers 33. The hose conveyers 33 lead directly to the seed-spouts 39 hinged by lugs or ears 40 to brackets 41 on the frame F, the spout 39 telescoping with a lower extension 39' whereby the length of the spout as a whole may be carefully adjusted. The connection and adjustment of the sections is effected by rods 42 having screw-threaded portions passing through lugs 43, 43' of the respective sections of the spout, the final adjustment as to length being accomplished by the nuts $n$ (Fig. 7) as obvious. The discharge ends of the spouts are provided with the wings 44 by which the seed is prevented from scattering as it leaves the spout and falls into the furrow made by the plow.

It is obvious of course that as the gears 22 and 23 are disengaged as previously described, not only does rotation of the hopper-shaft 16 cease, but rotation of the seed-shaft 27 geared thereto must also cease. When these shafts come to a stop, it is desirable of course that the several seed-spouts be lifted or swung out of the way or above the ground passed over to avoid obstructions, and this swinging of the spouts is accomplished by the same lever 26 which disengages the gear 22 from the gear 23. This disengaging mechanism is best explained by a reference to Figs. 1, 2 and 3. Mounted in brackets 45, 46 is a rocker-bar 47 (having suitable rounded portions or bearings in the brackets to permit rotation) from which project forwardly a series of arms 48 to whose free ends are attached the adjacent ends of chains 49 whose opposite ends are secured to lugs 50 on the upper sections 39 of the seed-spouts. Now, (Fig. 3) at one end of the rocker-bar 47 is secured a crank-arm 51 to which is pivotally coupled one end of a link 52 the opposite end of the link carrying a pin 53 which couples it to the arm 21 and travels in the elongated slot 54 of the lower curved end of a rigid arm 55 depending from the frame. It is apparent from Fig. 3, that as the arm 21 swings to the left (in said figure) upon tilting of the lever 26, in proper direction, the connecting pin 53 will be forced upward along the curved slot 54, forcing the link 52 with it, the latter in turn oscillating the crank arm to the left (see dotted position Fig. 3), and hence rocking the bar 47 in proper direction to raise all the arms 48, and thus draw on the several chains 49 and elevate or swing upwardly the several spouts to inoperative position (see dotted position Fig. 7). The rear of the frame may also be raised or lowered by reason of the adjustment of which the bearing wheel W' is capable. As seen in the drawings the wheel is mounted at the lower end of a member or arm 56 having a terminal lug or bracket 57 through which operates the adjusting screw 58 operated by a hand-wheel 59, the base of the screw passing through a bracket 60 by which it is supported. By turning the screw 58 in either direction, the arm or member 56 will be raised or lowered as the case may be, and hence the elevation of the rear end of the frame adjusted accordingly.

The plow-shares or blades 61 are secured to arms or hinge-members 62 pivoted at the lower ends of the series of depending ribbed arms or brackets 63 bolted to the frame, the medial portion of each hinge member 62 having pivotally coupled thereto one end of a short horizontal link 64 whose opposite end is pivotally secured to the adjacent end of a bent lever 65 pivoted at an intermediate point to the ribbed bar 63. The upper end of the lever 65 of the rear plow is pivotally coupled to a connecting rod 66 leading forward to the lower arm of a plow-lever 67; the upper end of the bent lever of the intermediate plow is pivotally coupled to a connecting rod 66' leading rearward to the lower arm of a plow-lever 67'; the upper end of the bent lever 65 of the forward plow is pivotally coupled to a connecting rod 66" leading rearward to the lower arm of a plow-lever 67". Upon tilting the levers 67, 67', 67" or either of them in proper direction to impart a push against or pull its respective connecting rod 66, 66' 66", the bent lever 65 of any plow will be tilted in proper direction to raise the plow off the ground (Fig. 3, dotted position). Of course each lever is provided with a locking pawl and rack-plate of ordinary and well known construction and need not be referred to in detail.

Like most planters the present machine is provided with rake arms or harrows 68. These are suspended in series of three, each from a common rocker-bar 69 disposed at an angle to the length of the frame, the inner members of the respective series of rake-arms being pivotally coupled to a common link-bar 70 and the forward rake having coupled thereto a rearwardly extending arm 71 whose rear end is pivoted to a pin 72 projecting at right angles from the end of the lower arm of a rake-lever 73. By oscillating the lever 73 in proper direction, the rake-arms of the several series may be rocked or swung out of the way, or from the ground over which they would otherwise pass (see dotted position Fig. 9) I may provide the machine with a disk or colter 74 in front of the last plow, and carried by an arm 75, for starting the furrow which said plow is to cut.

It will be seen from the foregoing that any or all of the operating parts may be instantly thrown out of commission, by a proper manipulation of the various levers 12, 26, 67, 67', 67", 73, all within easy reach of the operator; the seed may be cut off from the seed-spouts, the latter swung upward, the plows raised off the ground as well as the rakes, either end of the machine adjusted, the lengths of the seed-spouts adjusted, all these features contributing to make the present plow and seeder desirable and highly efficient.

Since the operations of the various portions has been described in connection with the descriptive portion of the parts themselves, there is no occasion to reiterate them at this point.

Having described my invention what I claim is

1. In a plow and seeder, a frame, bearing wheels for the same, a seed-hopper, a series of valve-casings receiving the seed from the hopper and having discharge openings, a series of vertically oscillating seed-spouts communicating with the discharge openings of the valve-casings, a stirrer-shaft in the hopper, stirrer arms on the shaft for impelling the seed into the respective valve-casings, a series of seed-valves having feed sections rotated from the stirrer-shaft, an oscillating arm depending from the frame, a gear and a sprocket wheel at the free end of the arm, a gear on a bearing wheel of the machine meshing with the gear on the oscillating arm, a sprocket wheel on the stirrer-shaft of the seed-hopper, a sprocket chain connecting the said sprocket wheel with the sprocket on the oscillating arm, a vertically oscillating lever, a link connecting the lever with the oscillating arm, a rocker-bar, a series of arms projecting from said bar, chains connecting the arms with the seed-spouts aforesaid, a crank-arm on the rocker-bar, a rigid arm depending from the frame and terminating in a curved slotted portion, a link connecting the crank-arm with the oscillating arm through said slotted portion of the rigid arm, whereby upon tilting of the lever, there follows an upward swing of the oscillating arm, a disengagement of the gearing between the bearing wheel and the stirrer-shaft, and a rocking of the rocker-arm and a consequent lifting of the seed-spouts, substantially as set forth.

2. In a plow and seeder, a front truck comprising a rotatable shaft, terminal arms forming a yoke therewith, bearing wheels at the ends of the arms, a sprocket wheel on the yoke shaft, a ratchet and spindle therefor mounted in proximity to the yoke-shaft, a sprocket wheel on the ratchet-spindle, a sprocket chain connecting the last sprocket wheel with the sprocket wheel on the yoke-shaft, a lever and pawl for actuating the ratchet, and a trigger normally holding the ratchet against rotation, the parts operating substantially as, and for the purpose set forth.

In testimony whereof I affix my signature, in presence of two witnesses.

FRANK THÜRRID.

Witnesses:
EMIL STAREK,
MARY D. WHITCOMB.